Patented Aug. 23, 1932

1,873,056

UNITED STATES PATENT OFFICE

DILLON F. SMITH, OF PENSACOLA, FLORIDA, AND ERNEST J. PIEPER AND CLARENCE C. VOGT, OF LANCASTER, PENNSYLVANIA, ASSIGNORS TO ARMSTRONG CORK COMPANY, OF LANCASTER, PENNSYLVANIA, A CORPORATION OF PENNSYLVANIA

MANUFACTURE OF FIBROUS ARTICLES

No Drawing.   Application filed November 25, 1931. Serial No. 577,384.

This application is a continuation in part of our copending application Serial No. 331,386, filed January 9, 1929.

The present invention relates to the manufacture of fibrous articles, more especially to the manufacture of board, both heat insulating and hard pressed, used in building construction, from the refuse chips of southern pine as obtained from rosin extracting plants. The wood furnished to the rosin extracting plants is the dead wood from the old lumbering operations in the southern pine forests. After the lumbering operations, there remain the stumps together with waste branches and some logs. The stumps, in particular, have a high rosin content, in many cases over 20 to 25 per cent of the weight of the wood. The stumps are pulled or blasted and are brought into the rosin extracting plants together with a small amount of dead limbs and are treated for the recovery of of turpentine, pine oil and wood rosin.

The wood, after its receipt at the rosin extracting plant, is first chipped. The chips are usualy in the neighborhood of 1¼ to 1½ inches long, ¼ to ½ inch wide and ⅛ to ¼ inch thick and are of irregular shape. These chips are first steam distilled with superheated steam at about 300° F. to extract the turpentine and pine oil. The chips are then treated with a solvent such as gasoline or naphtha to dissolve the rosin which is later recovered by evaporating the gasoline or naphtha solvent. After the extracting solvent is drained from the chips, the chips are subjected to distillation with superheated steam at about 300° F. to recover the solvent remaining in the chips.

In the commercial operation of rosin extracting plants, the naphtha, which is commonly used as an extracting solvent, does not extract all of the rosin from the chips. It leaves on the average about 5 to 6% of unextracted rosin in the chips. The chips thus treated are known commercially as completely extracted chips although they still contain a small amount of residual unextracted rosin. The solvent is practically completely removed by the strong steam distillation.

The treatment to which the chips are subjected in the rosin extracting plants alters the characteristics of the chips from those of the untreated chips. The action of the solvent while removing the greater part of the rosin from the chips, apparently leaves the residual rosin substantially uniformly distributed through the fibers of the wood. The high temperature superheated steam distillation apparently modifies the wood, hardening the wood fibers and rendering them somewhat more brittle, and also causing some decomposition of the lignins and/or other cementing material into water soluble acid bodies.

The extracted chips from the rosin extracting plants have commonly been regarded as of little or no value for pulp or paper making purposes and to have a value only as a fuel. These chips are obtainable in large quantities from the rosin extracting plants at a very low price.

The chips, as received from the rosin extracting plants, contain a considerable amount of water soluble materials, including water soluble acid bodies apparently produced by the decomposition of the lignins and other cementing materials by the high temperature superheated steam distillation. We have found that by a suitable chemical treatment these water soluble constituents can, to a large extent, be removed or converted into water insoluble bodies, thereby producing a board fiber having low water absorbing qualities.

We will now describe in detail the preferred procedure in carrying out our process. The extracted chips from the rosin extracting plants are first run through a rod mill in which they are subjected to the pounding action of metal rods in a hot water alkaline solution, preferably of caustic soda, although other alkalies may be used, such as caustic potash or the carbonates of sodium or potassium. This results in breaking down the chips into a relatively coarse pulp, the chips being broken up into smaller pieces about the cross-section of toothpicks. At the same time, the caustic solution saturates the wood fiber and softens it. The hot caustic solution dissolves a part of the rosin, converting it into a rosin soap, and in the case of caustic soda, converting it into soluble sodium resinate. The hot caustic solution also dissolves to a large extent the water soluble acid bodies, lignin and/or other cementing material and removes these materials from the fiber. Some hydration of the fiber takes place in the rod mill.

Hot water at a temperature usually about 125° F. is employed for the caustic solution in the rod mill. The hot water assists in leaching out the water soluble bodies from the fiber and also tends to speed up the conversion of the rosin into sodium resinate as well as increasing the amount of hydration. For economy in operation, the water solution is usually about 125° F., although hotter water at 145° to 150° F. may be used. The effect of the hotter water is apparently to cause a greater dissolving and leaching out of the lignins and other noncellulosic materials during the limited time that the chips are passing through the rod mill and to produce a fiber which gives a completed board of somewhat lower density than when the usual water temperatures of, say, about 125° F. are employed.

The preferred device for carrying out this step of the process is an ordinary rod mill such as is used for grinding ores and pigments. A mill which has been found satisfactory consists of a cylinder of about six feet in diameter and about twelve feet long containing about 40,000 pounds of 3" diameter steel rods. The cylinder is rotated and the rods slide or tumble over each other with a rolling or crushing action on the chips. The chips and the caustic solution are fed in at one end of the mill and the coarsely crushed fiber or pulp is continuously discharged from the other end of the mill. In the mill operation as carried out, an individual chip takes about 8 to 10 minutes to pass through the rod mill.

The dilute caustic solution is used in an amount to produce a mass as discharged from the mill which contains about 20% of the dry wood fiber by weight. The amount of caustic soda used may be varied. In practice, we have used caustic soda in amounts varying from about 1% to 2½% by weight of the dry chips. This amount of caustic soda is considerably more than that theoretically required for converting the residual rosin in the chips into sodium resinate. Computations show that about ½ of 1% caustic soda by weight to the dry chips would be required to saponify about 5% residual naphtha soluble rosin content in the chips. The excess caustic beyond this is apparently required to neutralize and dissolve the acidic decomposition products formed by the superheated steam treatments to which the chips were subjected. In spite of the caustic soda used being in excess of that theoretically required to saponify all of the rosin, the rosin is not all saponified but an amount of the residual rosin from the extraction treatment is allowed to remain in the fiber. Usually, about ½% of naphtha soluble rosin by weight of the dry fiber is allowed to remain.

The strength of the caustic solution is governed by the amount of residual rosin desired to be left in the pulp and by the yield of pulp desired after such treatment. During the steam treatments of the chips for the removal of the turpentine and the naphtha solvent, the wood and particularly the lignins and/or other cementing material is subjected to a certain amount of decomposition yielding certain decomposition products of an acid character. We believe that this action of the steam treatment is to modify some of the constituents of the wood forming more soluble acidic products. The strength of the caustic solution should be such as to saponify and remove the more soluble of these products but should not be strong enough to attack the less soluble products thereby reducing the yield to an uneconomical point. In actual operation, the strength of the caustic solution is regulated so that the final yield of dry fiber amounts to about 80% of the weight of the dry chips. With a strength of caustic solution to give such a percentage yield, it is found that sufficient residual rosin is allowed to remain unsaponified within the fibers of the wood.

The disintegrated chips or coarse pulp discharged continuously from the rod mill is fed with some additional water, preferably hot water at 125° F., to a mill which reduces the coarse pulp to a finer condition. The preferred mill is of the attrition type and in the installation used by us consisted of two 36" diameter rotatable discs having opposing corrugated surfaces. The discs rotate in opposite directions and in close proximity to each other. The mill which we used is that known to the trade as a "Bauer" mill. The distance between the plates and the rate of feed are regulated to produce the desired size and length of fiber. The action of the hot caustic solution in dissolving and leaching out the undesirable water soluble lignins and acidic decomposition products is continued in the Bauer mill. Further hydration of the fibers also takes place in the Bauer mill.

The pulp as it leaves the Bauer mill is sufficiently thin to flow by gravity into suitable storage tanks. The pulp is next concentrated by means of a machine ordinarily known as a decker. The decker comprises a rotating hollow drum of wire cloth over which the pulp is fed, excess water escaping through the wire cloth. The decker as we have employed it, leaves about 83% of water to about 17% of fiber in the fibrous mass as delivered from the decker. The pulp is concentrated because it has been found desirable to remove some of the so-called "black" liquor which contains rosin soap solution as well as dissolved lignins and/or dissolved decomposition products. A sufficient amount, however, of the black liquor is left in the decker stock to furnish sizing material for the pulp.

After leaving the decker the pulp is put into a beater or stirring tank and water is added to bring it to the desired consistency for sizing. A coagulant or rosin fixing reagent such as aluminum sulphate or paper makers' alum, aluminum chloride, calcium chloride or other salt which will convert the rosin soap into a rosin size, is then added to give a pH value to the mass of about 4.5 and to size the pulp.

The paper makers' alum apparently has the dual function of precipitating aluminum resinate from the saponified rosin and of converting some of the dissolved organic compounds peculiar to the superheated steam treated extracted chips into a water repellant sizing and binding material. As explained above, the black liquor which remains with the fiber contains not only the sodium resinate resulting from the saponification of a part of the rosin, but also contains the dissolved lignins and the neutralized and dissolved water soluble acidic decomposition products produced during the treatment of the chips in the rosin extracting plants. Tests have indicated that some at least of these latter products are rendered insoluble and are precipitated upon the fibers as a valuable water repellant sizing and binding material, materially increasing the water repellant and other desirable properties of the board, such as the coherence of the fibers and strength of the board. Tests have indicated that the sizing and binding material as precipitated from the black liquor obtained by the caustic treatment of the superheated steam distilled chips produces a better board than that obtained by precipitating a sizing consisting entirely of aluminum resinate upon fibers washed free from such black liquor.

The sized pulp is then thinned and run to a suitable machine for converting it into sheeted insulating board in accordance with the usual insulating board making practice. In making the board, the fluid pulp is first passed over a wire screen filter on a rotating drum to remove the excess water. The formed sheet of pulp is later passed between two blankets under relatively light pressure to squeeze out further water and to bring the board to the desired density. The formed board is then passed through a heated drier to remove the remaining moisture and is then ready to be trimmed, cut and shipped.

The physical characteristics of the insulating board produced as above described are as follows:—

It is a rather hard, stiff board of open fibrous structure containing a considerable proportion of dead air spaces making it an excellent heat insulating board. The weight may be varied by the amount of pressure applied to the wet sheet on the forming machine or by passing the board through a roll press, and may vary from less than one pound to two and one-quarter pounds per board foot. The board can be readily sawed and will hold nails. The board has a remarkably low water absorption as indicated by the tests prescribed by the United States Bureau of Standards which consist in immersing a piece of the board in water at a specified temperature for a specified length of time and then removing the board, and allowing it to drain for a specified length of time, weighing it and noting the increase in weight due to the water absorption. The water absorption thus determined is much lower than that of the usual commercial insulating boards of the same weight per board foot.

The condition of the resinous and other water repellant bodies in the wood fibers is apparently a large contributing factor toward the physical properties of the board. In addition to the cellulosic base material of the fibers, the fibers apparently contain or are coated with resinous water repellant bodies of the following character:

1. The insolubilized acidic decomposition products and/or lignins or other cementing material precipitated from the black liquor;
2. The aluminum resinate precipitated from black liquor; and
3. The residual rosin which is allowed to remain in the fibers by the control of the strength of the hot caustic digesting liquor.

The dead wood which is used in the rosin extracting plants is obtained from dead stumpage and branches which have been exposed to the weather for many years. In fact, most of the plants will not take dead stumpage unless the wood has been dead for ten years or more. During the long standing of the dead stumpage, some of the rosin tends to undergo a gradual change and becomes oxidized into what is known as "nigger" rosin. The oxidized or nigger rosin is more difficultly soluble than the unoxidized rosin. The residual rosin which remains in the completed pulp fiber probably consists largely of the oxidized or nigger rosin which is less soluble and apparently more inert than the unoxidized rosin which is more readily removed by the naphtha and saponified by the caustic soda.

As above explained, the high temperature superheated steam treatment to which the extracted chips are subjected may be another contributing factor to the physical properties of the board. The steam treatment probably hardens the wood fiber as well as breaks down the lignins and other cementing materials into soluble acidic decomposition products which are chemically removed from the fibres by the hot caustic solution, leaving the less soluble and more water resistant material in the fibers.

The above reasons are indicated by the various tests and experiments which we have so far carried out and are advanced as a probable or possible explanation of the chemical reactions taking place beginning with the treatment of the chips in the rosin extracting plant and continuing through that of the board making plant, and giving the physical properties to the completed board. It will be understood, however, that these reasons are more or less theoretical and are stated in order to more lucidly present what we believe to be the chemical reactions involved, and that the invention is not limited to or by such theoretical explanation.

The board may be made entirely from the fiber obtained from the refuse chips from rosin extracting plants, or other fiber may be mixed therewith if desired. The strength of the board, particularly where the board is made in thin sections, may be increased by adding a longer fibered pulp, such, for example, as sulphate paper pulp, kraft pulp, or the like. This longer fibered pulp may be added to the pine chip pulp either before or after the pine chip pulp has passed through the Bauer mill. If it is desired to utilize the added pulp in a hydrated condition so as to increase its bonding properties, it may be added to the pine chip pulp before it is passed through the Bauer mill, or the added pulp may be separately hydrated and then added to the pine chip pulp either before or after the pine chip pulp has passed through the Bauer mill. On the other hand, if it is desired to utilize the added pulp with a low degree of hydration, it is added after the pine chip pulp has been delivered from the Bauer mill. Also, if desired, other long fibrous material, such as rice straw fiber, may be mixed with the pine chip pulp to increase the mechanical strength of the board.

The added pulp, such as the sulphate paper pulp, kraft pulp, or the like, is used in a minor proportion, that is, the added pulp is less in quantity than the pulp formed from the pine chip fiber. Usually when a pulp such as a sulphate paper pulp or kraft pulp is used, it is added in amounts from about 5 to 25% of the resultant pulp mixture.

The added pulp is thoroughly beaten with the pulp formed from the pine chips and before the pulp is sized. The added pulp, such as the sulphate paper pulp or kraft pulp, is thoroughly saturated with the black liquor of the pine chip pulp, and when the resultant mixture of pulp is sized, the precipitating chemical, such as the paper makers' alum, causes the deposition on the fibers of the added pulp as well as on those of the pine chip pulp of the sizing and bonding material peculiar to the black liquor made by the alkaline treatment of the pine chips. Since the board may be made either entirely from the pine chip fiber or may have other fiber mix added thereto, we intend to include within the purview of our invention the use of either the pure pine chip pulp or the admixture therewith of other pulp. When we speak of our process as being one of making fibrous articles from the refuse solvent extracted southern pine chips from rosin extracting plants, we do not mean that there shall be excluded therefrom the addition, if desired, of other fibrous materials, and when we speak of pulp formed from the pine chips we mean to include thereby pulp formed from the pine chips but which may also contain other fibrous material.

While the process has been described with particular reference to the production of insulating construction board, other fibrous articles may be made, such for example as a hard pressed board, by subjecting the sheeted fiber to heat and pressure. In making a hard pressed board, additional binding and waterproofing material, such as asphalt, varnishes, etc., may be added. The pulp may be made into shapes other than board, as, for example, preformed insulation for refrigerators, and other molded articles of either a porous or dense texture, may be produced.

While we have described in detail the preferred embodiment of our invention, it is to be understood that the invention may be otherwise embodied and practiced within its scope as defined in the following claims.

We claim:

1. The process of making fibrous insulating bodies from the refuse solvent-extracted southern pine chips from rosin extracting plants, said chips containing some residual rosin, which comprises disintegrating the chips in an alkaline solution until the wood fibers are partially hydrated and a portion, at least, of the contained resin is converted into a soluble resinate, adding a precipitant to convert the resinate into a resin sizing, and forming the articles from the mass.

2. The process of making fibrous insulating bodies from the refuse solvent-extracted chips of southern pine from rosin extracting plants containing in the neighborhood of 5% to 6% of rosin, which comprises pulping the chips in a hot water solution containing about 1% of caustic soda by weight to the weight of the dry fiber until the fiber is partially hydrated and a portion of the rosin converted into sodium resinate, adding a precipitant to the pulp to convert the sodium resinate into a resin size, and forming the articles from the pulp.

3. The process of making fibrous bodies from the refuse solvent-extracted southern pine chips from rosin extracting plants, which chips, contain some residual rosin which comprises disintegrating the chips in an alkaline solution whereby a portion, at least, of the contained resin is converted into a soluble resinate, and thereafter adding a precipitant to convert the resinate into a resin sizing, and forming the article from the material.

4. The process of making fibrous bodies from the refuse solvent-extracted southern pine chips from rosin extracting plants, which chips contain some residual rosin, which comprises disintegrating the chips in an alkaline solution so as to convert a portion of the contained resin into a soluble resinate but leaving some of the resin in the wood fibers, and thereafter adding a precipitant to convert the resinate into a resin sizing, and forming the articles from the material.

5. The process of making fibrous articles from the refuse solvent-extracted southern pine chips from rosin extracting plants, which chips contain some residual rosin, which comprises forming a pulp of the chips in an alkaline solution whereby a portion at least of the contained rosin is converted into a soluble resinate, adding a precipitant to the pulp to form a resin sizing, and forming the pulp into the article.

6. The process of making fibrous articles from the refuse solvent-extracted southern pine chips from rosin extracting plants, which chips contain some residual rosin, which comprises forming a pulp of the chips in an alkaline solution so as to convert a portion of the contained rosin into a soluble resinate but leaving some of the rosin in the wood fibers, adding a precipitant to convert soluble resinate into a resin sizing, and forming the pulp into the article.

7. An insulating board consisting principally of the pulp fibers obtained from the refuse solvent-extracted southern pine chips from rosin extracting plants, which fibers contain residual rosin and having a sizing of the character and distribution imparted by the solution and precipitation of the natural rosin of the wood, said board being characterized by its light weight, open fibrous structure and low water absorption.

8. A fibrous article containing pulp fibers of the refuse solvent-extracted southern pine chips from rosin extracting plants, and having its fibers containing both residual undissolved rosin and a resin sizing precipitated thereon.

9. The process of making fibrous articles. which comprises chipping southern pine wood, extracting rosin from the chips with a solvent leaving a small amount of residual rosin in the chips, subjecting the extracted chips to a steam distillation which removes the remaining solvent and produces water soluble acid bodies, reducing the chips to pulp and subjecting the wood fibers to an alkaline solution which neutralizes and dissolves soluble acid bodies formed by the steam treatment and saponifies a part only of the residual rosin leaving part of the residual rosin in the fibers, treating the pulp which contains a part at least of the liquor thus formed from such alkaline solution with a reagent which precipitates sizing material from the liquor upon the fibers, and forming the pulp into the article.

10. The process of making fibrous articles from the refuse solvent-extracted southern pine chips from rosin extracting plants, which chips contain some residual rosin, which comprises reducing the chips to pulp and subjecting the pulp fiber to an alkaline solution forming a "black" liquor containing saponified rosin derived from the wood, removing a part only of the black liquor from the pulp and adding sufficient water to bring the pulp to the desired consistency for sizing, treating the pulp with a rosin fixing reagent to form a rosin size on the pulp from the saponified rosin of the black liquor, and forming the pulp into the article.

11. The process of making fibrous articles from the refuse southern pine chips from rosin extracting plants, which chips contain some residual rosin, which comprises forming a pulp of the chips in an alkaline solution of a strength sufficient to dissolve some of the substance of the chips and to saponify a part but not all of the residual rosin, thereby forming a "black" liquor, adding to the pulp which contains a part at least of such black liquor a reagent which precipitates a sizing material from the black liquor upon the pulp fibers, and forming the pulp into the article.

12. The process of making fibrous articles from the refuse southern pine chips from rosin extracting plants, which chips contain some residual rosin, which comprises forming a pulp of the chips in an alkaline solution of a strength sufficient to dissolve some of the substance of the chips and to saponify a part but not all of the residual rosin, thereby forming a "black" liquor, adding to the pulp additional fibrous material and saturating it with the black liquor, adding to the pulp which contains a part at least of such black liquor a reagent which precipitates a sizing material from the black liquor upon the fibers, and forming the pulp into the article.

In testimony whereof we have hereunto set our hands.

DILLON F. SMITH.
ERNEST J. PIEPER.
CLARENCE C. VOGT.